(12) United States Patent
Chen

(10) Patent No.: US 7,990,670 B2
(45) Date of Patent: Aug. 2, 2011

(54) PROTECTIVE CIRCUITRY FOR ELECTRONIC DEVICE

(75) Inventor: Chien-Chih Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 348 days.

(21) Appl. No.: 12/192,212

(22) Filed: Aug. 15, 2008

(65) Prior Publication Data
US 2009/0168272 A1    Jul. 2, 2009

(30) Foreign Application Priority Data
Dec. 27, 2007   (CN) .......................... 2007 1 0203450

(51) Int. Cl.
*H02H 3/00* (2006.01)
*G08B 21/20* (2006.01)

(52) U.S. Cl. ............. 361/88; 361/1; 137/78.3; 340/604; 340/605; 340/620

(58) Field of Classification Search ................ 361/1, 88; 137/78.3; 340/604, 620, 605
See application file for complete search history.

(56) References Cited

U.S. PATENT DOCUMENTS

| | | | | |
|---|---|---|---|---|
| 4,952,868 A * | 8/1990 | Scherer, III | .................... | 324/664 |
| 5,365,220 A * | 11/1994 | Rasmason | .................... | 340/620 |
| 5,428,347 A * | 6/1995 | Barron | .................... | 340/604 |
| 6,675,826 B1 * | 1/2004 | Newman et al. | .................... | 137/312 |
| 6,683,535 B1 * | 1/2004 | Utke | .................... | 340/604 |
| 2005/0174246 A1 * | 8/2005 | Picco et al. | .................... | 340/604 |
| 2006/0208914 A1 * | 9/2006 | Liu et al. | .................... | 340/620 |
| 2008/0094232 A1 * | 4/2008 | Yokote | .................... | 340/604 |
| 2010/0033883 A1 * | 2/2010 | Simon | .................... | 361/52 |

* cited by examiner

*Primary Examiner* — Jared J Fureman
*Assistant Examiner* — Scott Bauer
(74) *Attorney, Agent, or Firm* — Steven M. Reiss

(57) ABSTRACT

A protective circuitry (20) is connected between a power input port (11) and an electronic component (12) of an electronic device. The protective circuitry includes a field effect transistor (21) and a detection unit (25). The field effect transistor has a gate and a drain both electrically connected to an anode of the power input port, and a source electrically connected to a cathode of the power input port via the electronic component. The detection unit has two conductive pads spaced to each other. One pad is electrically connected to the gate and the other pad is electrically connected to the cathode of the power input port.

6 Claims, 5 Drawing Sheets

PROTECTIVE CIRCUITRY FOR ELECTRONIC DEVICE

BACKGROUND

1. Technical field

The present invention relates generally to protective circuitry for electronic devices, and more particularly to a protective circuitry which can protect an electronic device from water damage by automatically switching off power to electronic components of the electronic device.

2. Description of the Related Art

Electronic devices may be damaged when they come into contact with water and/or are subjected to high humidity environments. Thus, protecting electronic devices from water or humidity is a problem. However, currently, most electronic devices lack this protection. When these electronic devices contact water or are placed in a damp environment, the electronic components within the electronic device may short circuit and destroy or damage the electronic device.

Therefore, there is room for improvement within the art.

BRIEF DESCRIPTION OF THE DRAWINGS

Many aspects of the present protective circuitry for electronic device can be better understood with reference to the following drawings. The components in the drawings are not necessarily drawn to scale, the emphasis instead being placed upon clearly illustrating the principles of the present protective circuitry and its potential applications. Moreover, in the drawings, like reference numerals designate corresponding parts throughout the several views.

DETAILED DESCRIPTION OF THE PREFERRED EXEMPLARY EMBODIMENTS

The present protective circuitry is particularly suitable for electronic devices, such as mobile phones, personal digital assistants (PDAs), palm computers, and the like.

Figure 1:
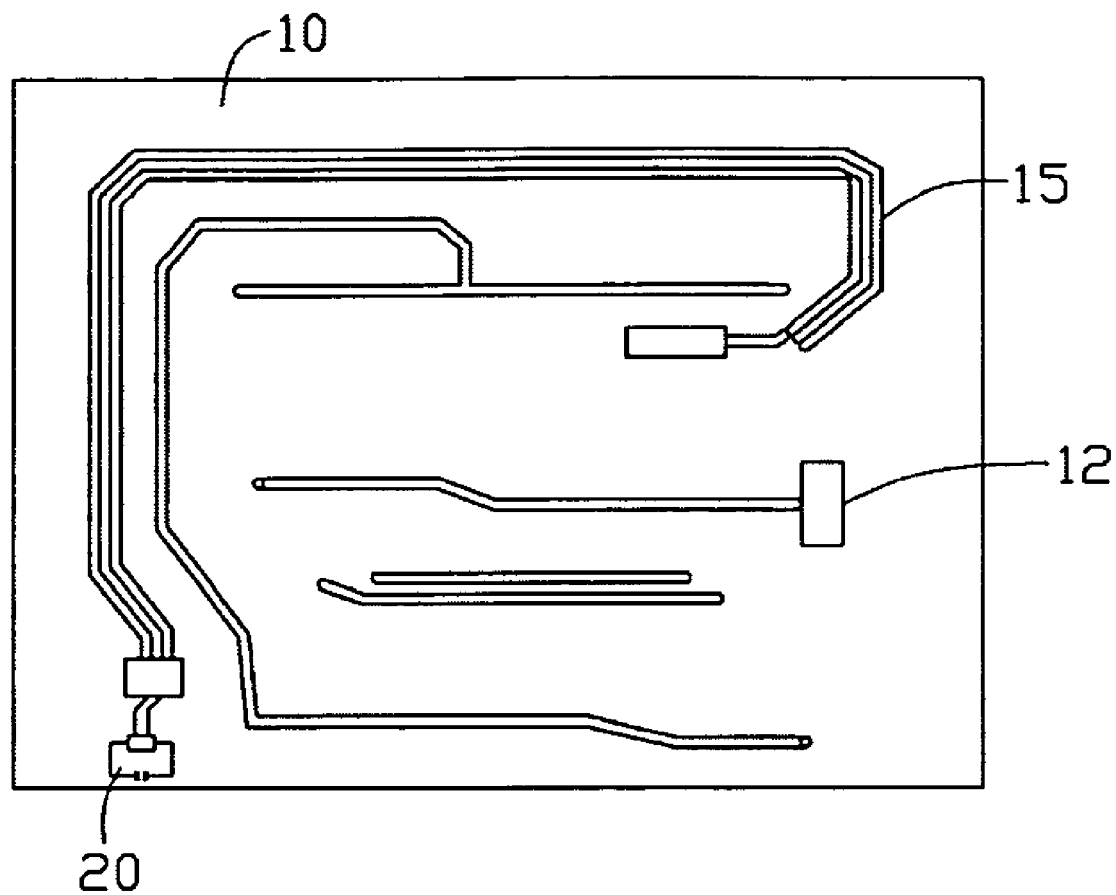
FIG. 1 shows a schematic view of a protective circuitry incorporated in a circuit board substrate of an electronic device according to a present exemplary embodiment.
Figure 2:
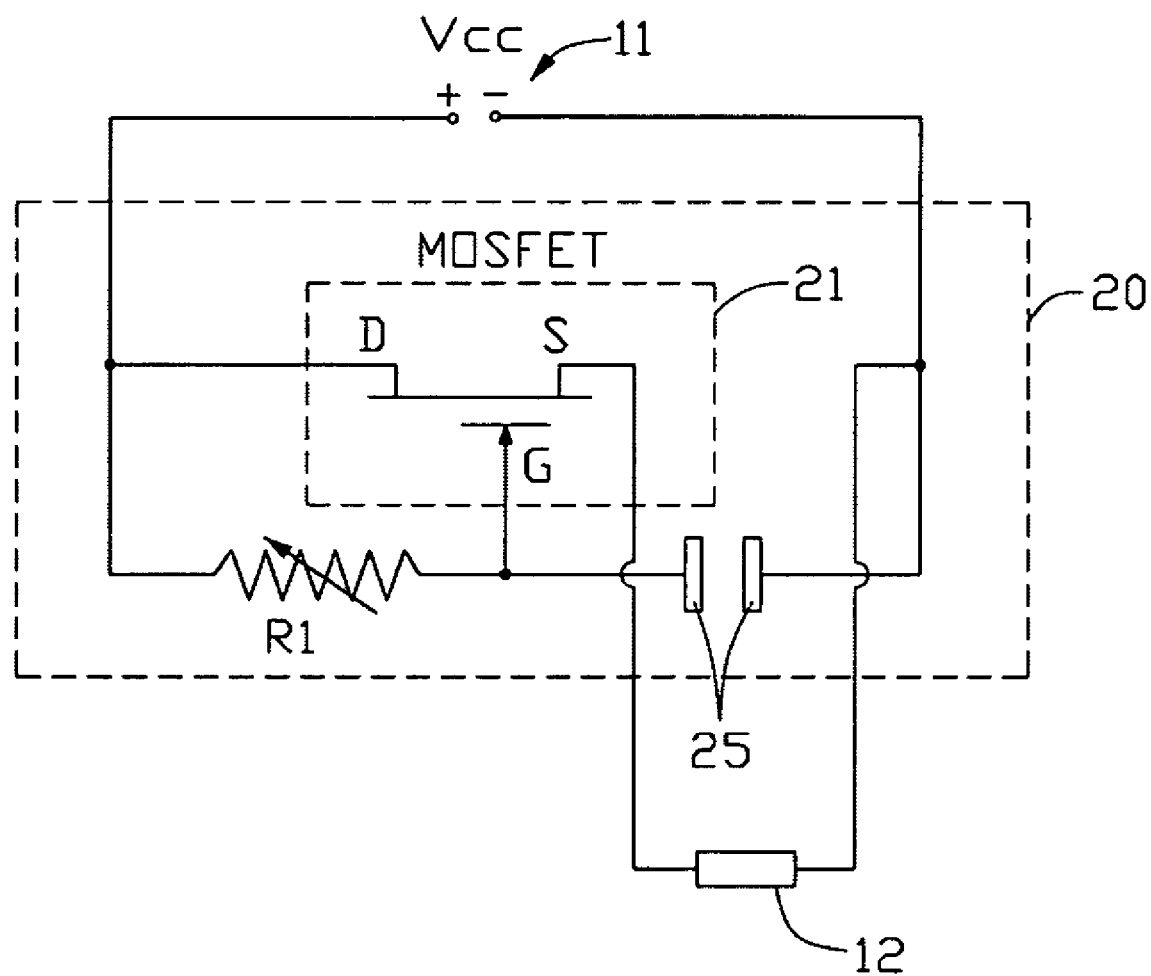
FIG. 2 is a schematic circuit diagram of the protective circuitry of FIG. 1, wherein the protective circuitry is working on a first state.

Referring now to FIGS. 1 and 2, a protect circuit 20 is incorporated on a circuit board substrate 10 of an electronic device (not shown). The circuit board substrate 10 incorporates a plurality of electronic components 12 for cooperatively achieving a desirable function of the electronic device, a plurality of connecting circuits 15 for electrically connecting the electronic components 12, and at least one protective circuitry 20 electrically connected between a power input port 11 and the electronic components 12. The power input port 11 is used to electrically connect with a power supply, e.g., a battery, to provide a working voltage $V_{cc}$ to the electronic components 12. The power input port 11 has an anode, and a cathode.

The protective circuitry 20 includes a field effect transistor (FET) 21, an adjustable resistor $R_1$, and a detection unit 25. The FET 21 can be but not limited to a metal oxide semiconductor field effect transistor (MOSFET), and has three terminals, i.e., a gate G, a drain D, and a source S. The FET 21 has two different modes depending on the voltages at the terminals. When the voltage between the gate G and the source S ($V_{GS}$) is smaller than a threshold voltage $V_{th}$, the FET 21 is in a cut-off mode, and there is no current flow between the drain D and the source S. When $V_{GS}$ is larger than $V_{th}$, the FET 21 is in a turn-on mode, and there is current flow between the gate G and the source S. The drain D is electrically connected to the anode of the power input port 11. The adjustable resistor $R_1$ is electrically connected in series between the anode of the power input port 11 and the gate G. The detection unit 25 includes two conductive pads spaced to each other. One pad of the detection unit 25 is electrically connected to the cathode of the power input port 11, and the other pad of the detection unit 25 is electrically connected to the gate G. The detection unit 25 is preferably located where water or moisture is prone to enter the electronic device, such as a joint between the covers of the electronic device. The electronic components 12 are electrically connected between the source S and the cathode of the power input port 11.

In use, a power supply is electrically connected to the power input port 11 of the circuit board substrate 10 to enable operation of the electronic device. When there is no water in the electronic device, there is no conduction between the two pads of the detection unit 25. The FET 21 devides a $V_{GS}$ larger than $V_{th}$, thereby making the FET 21 work on a turn-on mode. Therefore, the electronic component 20 can get power supply via the FET 21.

Figure 3:
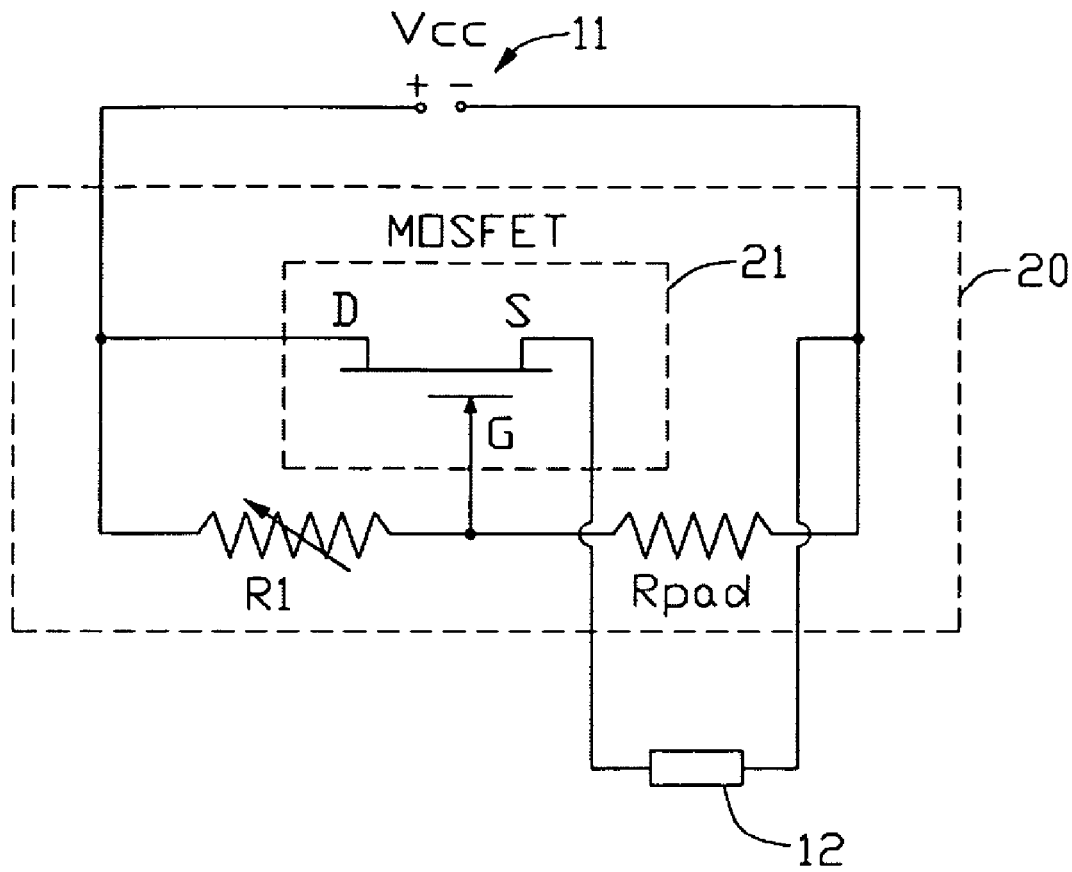
FIG. 3 is a schematic circuit diagram of the protective circuitry of FIG. 1, wherein the protective circuitry is working on a second state.

Referring to FIG. 3, when there is water in the electronic device, the two pads of the detection unit 25 are electrically connected to each other by the water, and act as a resistor $R_{pad}$ electrically connected between the gate G and the cathode of power input port 11. Since the resistor $R_{pad}$ has a voltage dividing function and divides part of the voltage, the $V_{GS}$ is reduced and becomes smaller than the $V_{th}$. Then, the FET 21 automatically switches to the cut-off mode. Therefore, there is no current flowing through the electronic components 12, and the electronic components 12 are shut down.

Figure 4:
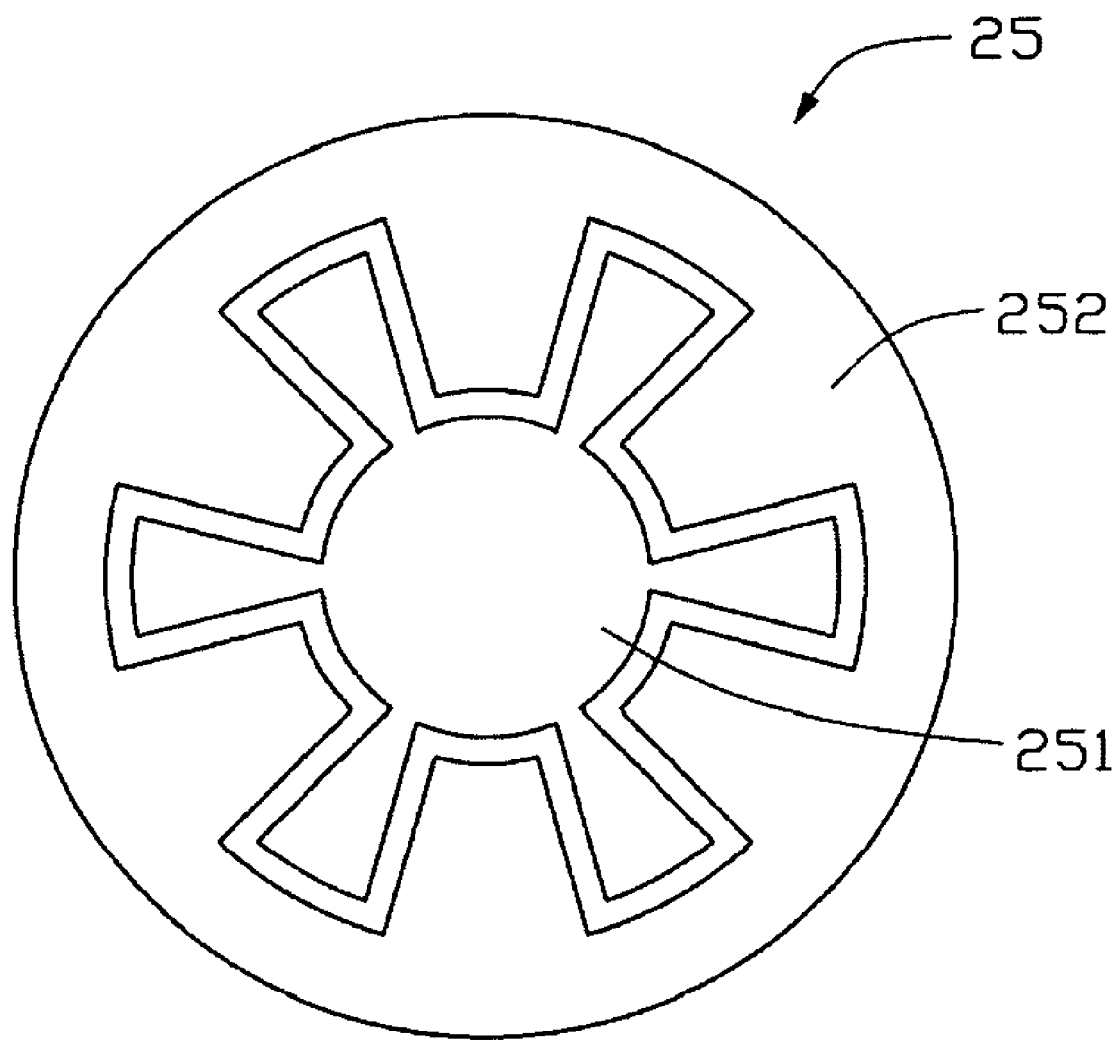
FIG. 4 shows a schematic view of a detection unit of the protective circuitry according to a second exemplary embodiment.
Figure 5:
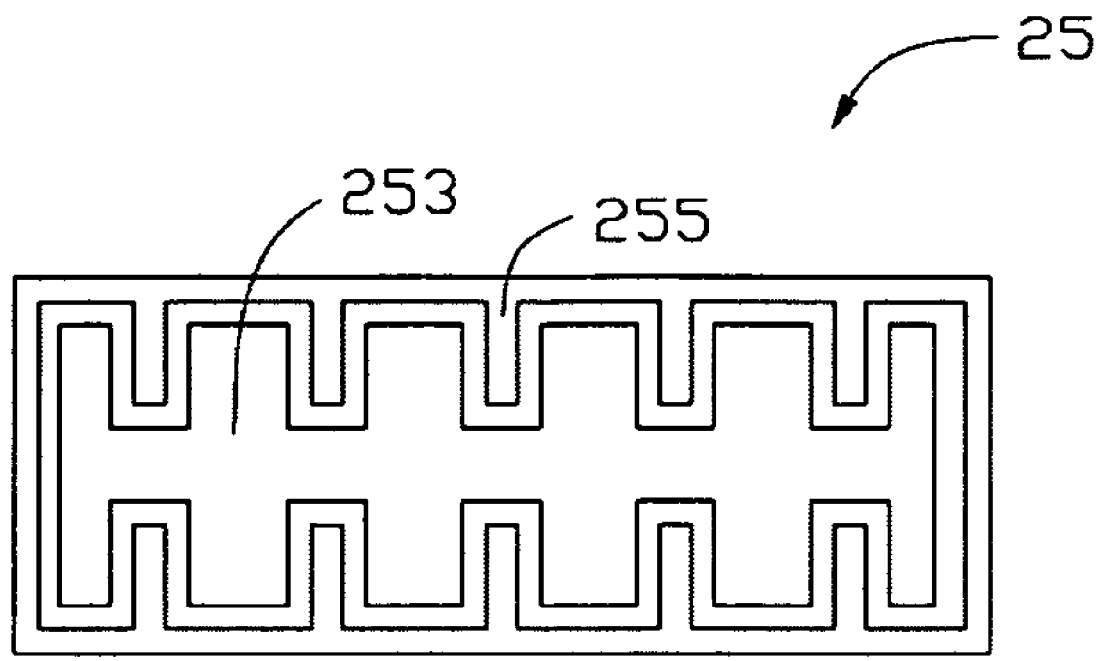
FIG. 5 shows a schematic view of the detection unit of protective circuitry according to a third exemplary embodiment.

The pads of the detection unit 25 can be bar shaped as shown in FIG. 2. In addition, the pads may be patterned as shown in FIGS. 4 and 5 to increase the sensitivity of the detection unit 25. As shown in FIG. 4, one pad 251 has a circular main portion and a plurality of leaves outwardly radially protruding from the main portion. The leaves are equally spaced to each other. The other pad 252 has a hole defined therein. The hole has a shape and size corresponding to that of the pad 251 to receive the pad 251. As shown in FIG. 5, one pad 253 is a toothed strip having leaves on two opposite sides. The other pad 255 has a hole defined therein. The hole has a shape and size corresponding to that of the pad 253 to receive the pad 253.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A protective circuit connected between a power input port and an electronic component of an electronic device, the protective circuit comprising:
   a field effect transistor, the field effect transistor having a gate and a drain, the drain electrically connected to an anode of the power input port, and a source electrically connected to a cathode of the power input port via the electronic component; and
   a detection unit, the detection unit having two spaced apart conductive pads, and one pad electrically connected to the gate and the other pad electrically connected to the cathode of the power input port, wherein when the conductive pads are connected to each other, the conductive pads having a voltage dividing function to reduce the voltage between the gate and the source to be smaller than a threshold voltage of the field effect transistor to make the field effect transistor switch to a cut-off mode;
   an adjustable resistor, and one end of the adjustable resistor electrically connected to the gate, and the other end of the adjustable resistor electrically connected to the drain and the anode of the power input port.

2. The protective circuit as claimed in claim 1, wherein the pads of the detection unit are bar shaped.

3. The protective circuit as claimed in claim 1, wherein a first pad of the detection unit has a circular portion and a plurality of leaves protruding radially outward from the circular portion, and a second pad has a hole defined therein to receive the first pad.

4. The protective circuit as claimed in claim 1, wherein a first pad of the detection unit is a toothed strip having a plurality of leaves protruding outwardly from opposite sides thereof, and a second pad has a hole defined therein to receive the first pad.

5. The protective circuit as claimed in claim 1, wherein the field effect transistor is a metal oxide semiconductor field effect transistor.

6. A circuit comprising:
   an electronic component;
   a power input port;
   a protective circuit comprising:
      a field effect transistor, the field effect transistor having a gate, a source and a drain, the drain electrically connected to an anode of the power input port, the electronic component electrically connected in series between the source and the cathode of the power input port;
      an adjustable resistor, one end of the adjustable resistor electrically connected to the gate, and the other end of the adjustable resistor electrically connected to the drain and the anode of the power input port;
      two spaced apart conductive pads, and one pad electrically connected to the gate and the other pad electrically connected to the cathode of the power input port, wherein when the conductive pads are connected to each other, the conductive pads having a voltage dividing function to reduce the voltage between the gate and the source smaller than a threshold voltage to make the field effect transistor switch to a cut-off mode; when the conductive pads are not connected, the voltage of between the gate and the source is larger than the threshold voltage to make the field effect transistor work on a turn-on mode for supplying the electronic component.

* * * * *